United States Patent
Furutani (10) Patent No.: US 8,833,528 B2
(45) Date of Patent: Sep. 16, 2014

(54) BRAKE DEVICE

(71) Applicant: Mitsubishi Heavy Industries, Ltd., Tokyo (JP)

(72) Inventor: Hideki Furutani, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 116 days.

(21) Appl. No.: 13/652,600

(22) Filed: Oct. 16, 2012

(65) Prior Publication Data

US 2013/0098720 A1    Apr. 25, 2013

(30) Foreign Application Priority Data

Oct. 19, 2011    (JP) .................................. 2011-229524

(51) Int. Cl.
| F16D 55/14 | (2006.01) |
|---|---|
| F16D 49/00 | (2006.01) |
| B60T 1/04 | (2006.01) |
| F16D 65/06 | (2006.01) |
| F16D 65/22 | (2006.01) |
| F16D 65/14 | (2006.01) |
| B61H 1/00 | (2006.01) |

(52) U.S. Cl.
   CPC ... B61H 1/00 (2013.01); F16D 49/00 (2013.01); B60T 1/04 (2013.01); F16D 65/06 (2013.01); F16D 65/22 (2013.01); F16D 65/14 (2013.01)
   USPC .......................................... 188/72.7; 188/343

(58) Field of Classification Search
   USPC ................. 188/343, 342, 71.7–72.9
   See application file for complete search history.

(56) References Cited

U.S. PATENT DOCUMENTS

| 4,759,429 | A * | 7/1988 | Margetts ....................... 188/343 |
|---|---|---|---|
| 6,938,737 | B2 * | 9/2005 | Hartsock ...................... 188/72.2 |
| 7,188,710 | B2 * | 3/2007 | Reuter et al. ................. 188/72.7 |
| 7,216,940 | B2 * | 5/2007 | Sommerfeld ................ 188/72.7 |
| 7,458,445 | B2 * | 12/2008 | Inagaki et al. ............... 188/72.7 |

FOREIGN PATENT DOCUMENTS

| JP | 47-2331 | 1/1972 |
|---|---|---|
| JP | 59-192665 | 11/1984 |
| JP | 61-150863 | 7/1986 |
| JP | 3280970 | 5/2002 |

(Continued)

OTHER PUBLICATIONS

Japanese Notice of Allowance issued Aug. 13, 2013 in Japanese Patent Application No. 2011-229524 with English translation.

(Continued)

*Primary Examiner* — Melanie Torres Williams
(74) *Attorney, Agent, or Firm* — Wenderoth, Lind & Ponack, L.L.P.

(57) ABSTRACT

A brake device includes: a damper; an advancing and retreating member; a support section; and wedge members. The support section is provided on an opposite side to the wedge members with respect to the advancing and retreating member, and is capable of supporting the advancing and retreating member on an application side in a drive direction. On one of the support section and the advancing and retreating member, there is provided a raised strip section which extends in a braking direction. On the other of the support section and the advancing and retreating member, there is provided a groove section which restricts movement of the raised strip section towards a release side in the drive direction, and restricts movement of the raised strip section to both sides in a widthwise direction orthogonal to the drive direction and the braking direction.

4 Claims, 8 Drawing Sheets

(56) References Cited

FOREIGN PATENT DOCUMENTS

| | | |
|---|---|---|
| JP | 2003-166572 | 6/2003 |
| JP | 2005-48877 | 2/2005 |
| JP | 2011-122703 | 6/2011 |
| JP | 2011-137481 | 7/2011 |
| KR | 20-1992-0004378 | 6/1991 |

OTHER PUBLICATIONS

Korean Notice of Decision to Grant issued Jun. 25, 2014 in corresponding Korean Patent Application No. 10-2012-0114213 with English translation.

* cited by examiner

BRAKE DEVICE

BACKGROUND OF THE INVENTION

1. Field of the Invention

The present invention relates to a brake device which applies a braking force to a braking target such as a wheel. Priority is claimed on Japanese Patent Application No. 2011-229524, filed Oct. 19, 2011, the contents of which is incorporated herein by reference.

2. Description of Related Art

As a brake device that applies a braking force to a wheel, there is know for example a device disclosed in Japanese Unexamined Patent Application, First Publication No. 2011-122703.

Figure 9:
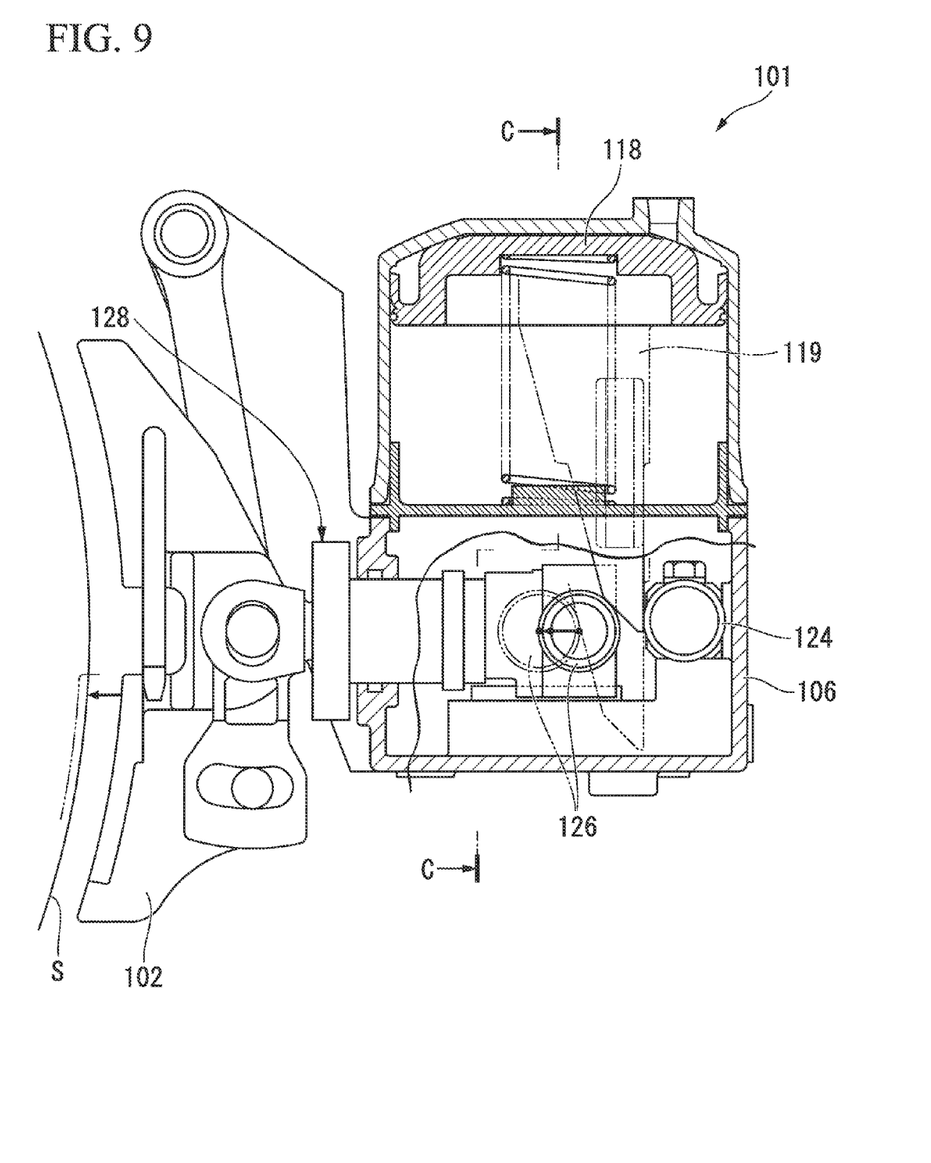
FIG. 9 is a cutaway cross-sectional view showing the main components of a conventional brake device.
Figure 10:
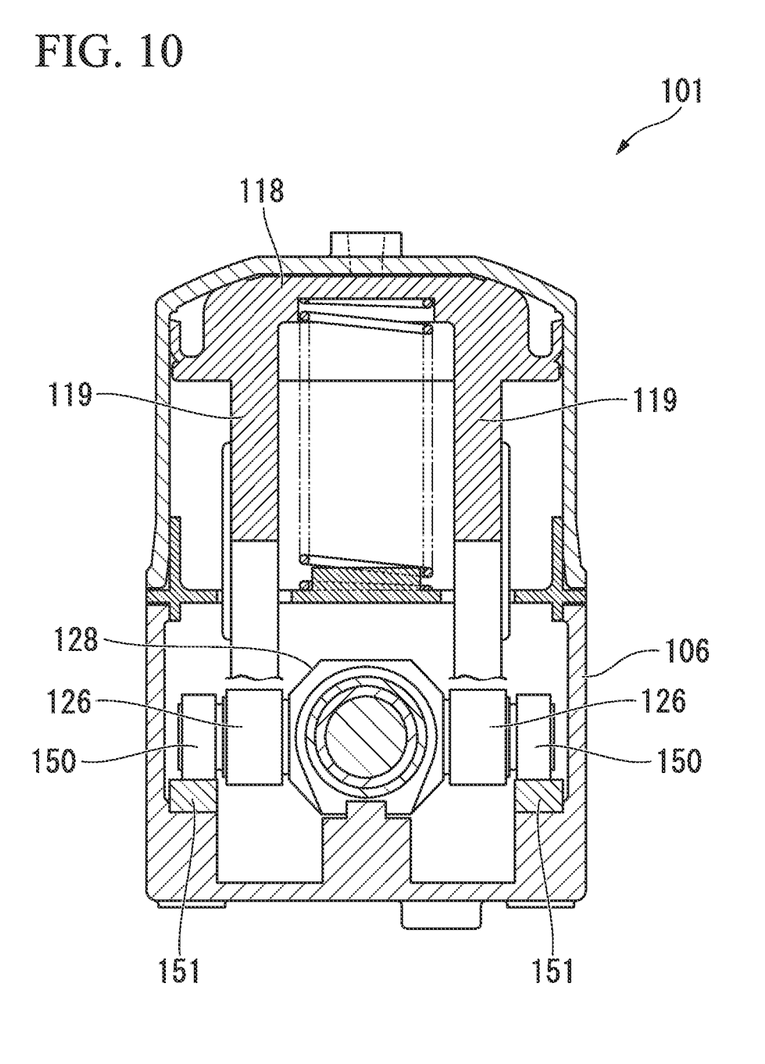
FIG. 10 is a cross-sectional view taken along the line C-C in FIG. 9.

As shown in FIG. 9 and FIG. 10, a brake device 101 described in the above patent document includes; a brake shoe 102 serving as a damper, a push rod 128, a casing 106, a piston 118, and wedge members 119. The brake shoe 102 applies a braking force to a tread surface S of a wheel. The push rod 128 causes the brake shoe 102 to advance and retreat in a braking direction towards the wheel. The casing 106 supports the push rod 128 in a manner capable of advancing and retreating in the braking direction. The piston 118 is provided inside the casing 106, and advances and retreats on receiving a driving force in the form of air pressure. The wedge members 119 are integrally fixed to the piston 118.

On both sides of the push rod 128 there are provided moving rollers 126. Furthermore, on the casing 106 side there is affixed a pair of fixed rollers 124 which receive a reaction force to the pushing force applied by the piston 118 to the push rod 128.

The two moving rollers 126 are configured so as to advance and retreat in the braking direction, accompanying the back and forth movement of the wedge members 119 in the drive direction orthogonal to the braking direction. That is to say, due to the back and forth movement of the wedge members 119 in the driving direction, the two moving rollers 126 which contact the incline surfaces 122 of the wedge members 119 are pushed in the braking direction. As a result, the push rod 128 advances and retreats in the braking direction.

When the push rod 128 advances or retreats in the braking direction, the push rod 128 causes guide rollers 150, provided coaxially with the moving rollers 126 and outside the moving rollers 126 in the axial direction, to travel along guide rails 151 provided in the casing 106. This restricts the movement direction of the push rod 128 to the braking direction.

However, in the brake device 101 described above, the guide rollers 150 project further to outside of the moving rollers 126 provided on the push rod 128. Consequently, a problem occurs in that the casing 106 is correspondingly larger.

SUMMARY OF THE INVENTION

The present invention provides a brake device which can be smaller in size.

According to a first aspect of the present invention, a brake device includes: a damper which applies a braking force to a braking target by advancing towards and contacting the braking target; an advancing and retreating member which causes the damper to advance and retreat in a braking direction towards the braking target; a support section which supports the advancing and retreating member in a manner enabling advancing and retreating in the braking direction; and wedge members provided so as to be capable of advancing and retreating in a drive direction orthogonal to the braking direction, which are advanced to an application side in a drive direction towards the advancing and retreating member, to thereby cause the advancing and retreating member to advance towards a braking side in the braking direction.

The support section is provided on an opposite side to the wedge members with respect to the advancing and retreating member, and is capable of supporting the advancing and retreating member on an application side in a drive direction. On one of the support section and the advancing and retreating member, there is provided a raised strip section which projects towards the other, and extends in the braking direction.

On the other of the support section and the advancing and retreating member there is provided a groove section which restricts movement of the raised strip section towards a release side in the drive direction, and restricts movement of the raised strip section to both sides in a widthwise direction orthogonal to the drive direction and the braking direction.

According to the brake device described above, the raised strip section and the groove section are provided on the advancing and retreating member and the support section at a position on the opposite side to the wedge members. Consequently, the load applied by the wedge members can be supported without providing support structures on both sides in the direction orthogonal to the braking direction. Therefore, the size of the guide mechanism for the advancing and retreating member can be reduced, and hence the overall size of the brake device can be reduced.

According to a second aspect of the present invention, the leading end of the raised strip section may have overhang sections which extend in the widthwise direction relative to a base end, and the groove section may have a shape that is widened at a bottom to correspond to the raised strip section.

According to the brake device described above, movement of the advancing and retreating member towards the release side in the drive direction can be more accurately controlled.

According to a third aspect of the present invention, the raised strip section may have a T-shaped cross-section, and the groove section may have a T-shaped cross-section corresponding to that of the raised strip section.

According to a fourth aspect of the present invention, the groove section may have a dovetail groove shape in cross-section, and the raised strip section may have a dovetail shape corresponding to that of the groove section.

According to the brake device described above, because the raised strip section and the groove section are provided directly on the advancing and retreating member and the support section, the size of the guide mechanism for the advancing and retreating member can be reduced, thereby enabling the overall size of the brake device to be reduced.

DETAILED DESCRIPTION OF THE INVENTION

Embodiments of the present invention are described in detail below with reference to the drawings.

Figure 1:
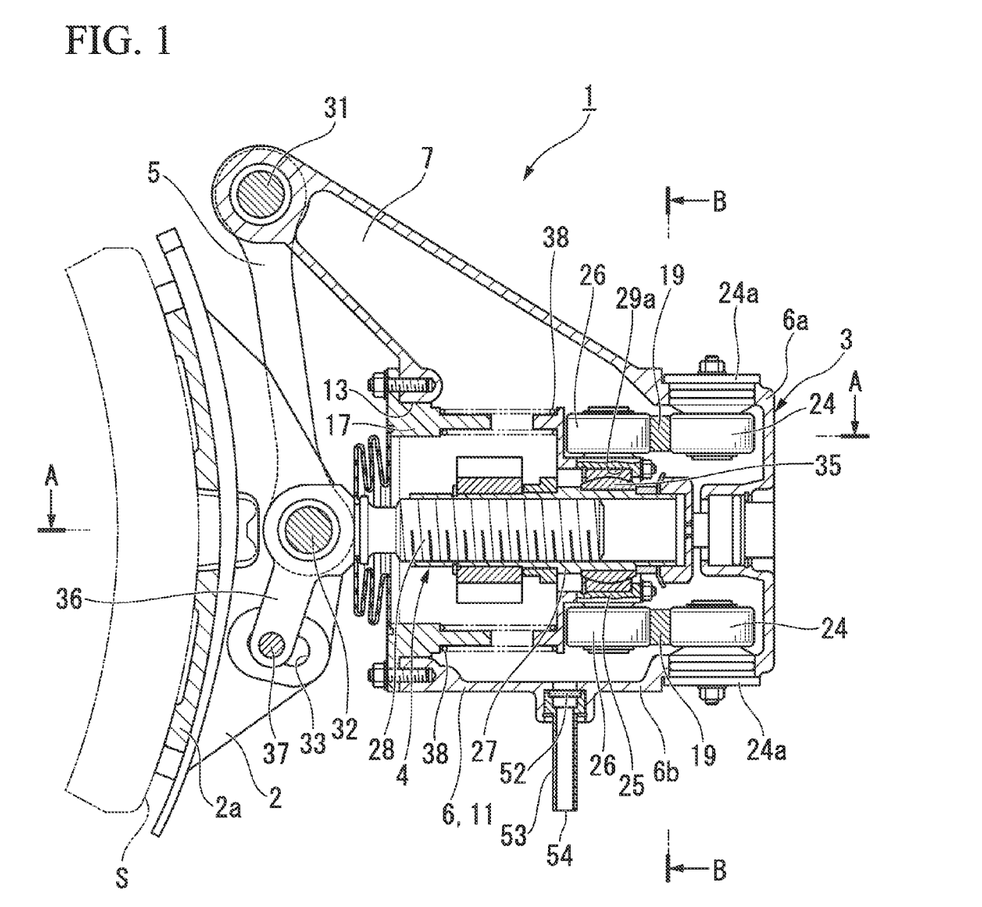
FIG. 1 is cutaway cross-sectional view showing the main components of a brake device according to an embodiment of the present invention.

As shown in FIG. 1, a brake device 1 of the present embodiment is a brake device for use with railway vehicles, more specifically a single-shoe tread brake unit which pushes a brake shoe (damper) 2 against a tread surface S of a wheel from one side. The brake device 1 is disposed obliquely upward of the wheel, and is mounted to the vehicle at a mounting section 45 (see FIG. 2A) via bolts or the like.

As shown in FIG. 1, the brake device 1 includes as its main components; a brake shoe 2, a main unit 3 including an advancing and retreating unit 4, and a hanger 5. The brake shoe 2 contacts a tread surface S of a wheel serving as the braking target, and applies a braking force to the wheel. The advancing and retreating unit 4 selectively moves the brake shoe 2 in a direction away from the wheel or in a direction approaching the wheel. The hanger 5 movably supports the brake shoe 2.

The brake shoe 2 is a member which generates a braking force when pushed against the tread surface S of a wheel, and is provided with a brake friction material 2a in the form of a curved plate at the point of contact with the tread surface S. The brake shoe 2 is connected to the hanger 5 by a connecting pin 32 serving as a pivot axis. Furthermore, a little below the pivot axis of the brake shoe 2, an incline adjustment opening 33 is formed. The incline adjustment opening 33 is described in detail later.

The main unit 3 has a casing 6 which provides its external shape, and on top of the casing 6, an arm section 7 which extends diagonally upward, is formed in an integrated manner. One end of the hanger 5 is pivotably attached to the leading end of the arm section 7 via a connecting pin 31. Accordingly, the hanger 5 can swing about a pivot point located at one end of the hanger 5. That is to say, when the hanger 5 pivots about the connecting pin 31, the brake shoe 2 connected to the other end of the hanger 5 moves relative to the main unit 3. Furthermore, the connection between the arm section 7 and the hanger 5 incorporates a torsion coil spring (not shown in the figure). The role of this torsion coil spring is to urge the brake shoe 2 in a direction away from the wheel.

Figure 2A:
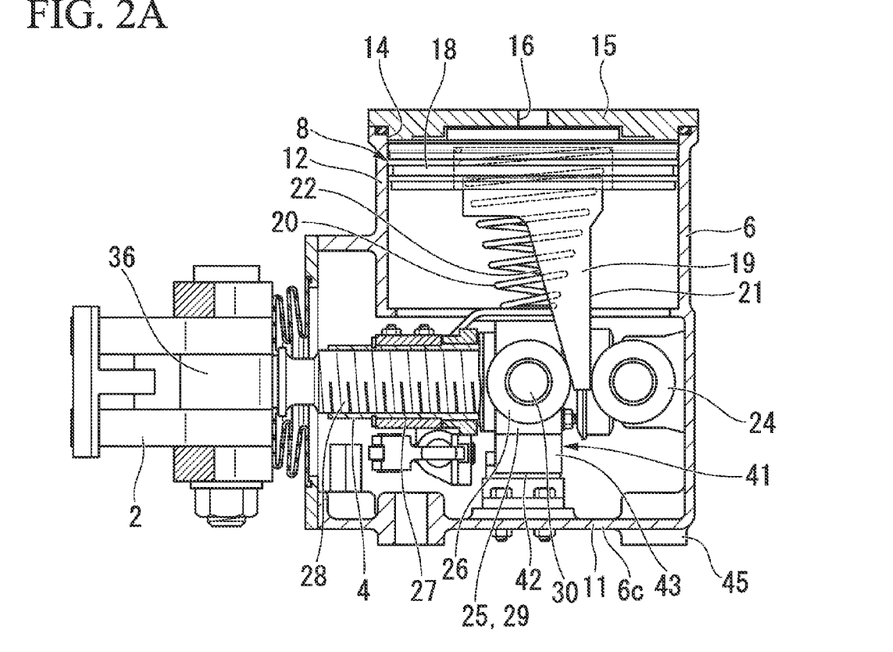
FIG. 2A is a cross-sectional view taken along the line A-A in FIG. 1, showing a state before insertion of a wedge member.

As shown in FIG. 2A, the inside of the casing 6 of the main unit 3 contains a piston unit 8, the advancing and retreating unit 4, and a pair of fixed rollers 24. The piston unit 8 generates a driving force for moving the brake shoe 2. The advancing and retreating unit 4 transmits the driving force of the piston unit 8 to the brake shoe 2. The pair of fixed rollers 24 is employed when the advancing and retreating unit 4 advances or retreats. In FIG. 2A only one fixed roller 24 is shown.

In the main unit 3, when a piston 18 that constitutes the piston unit 8 advances or retreats in response to a driving force produced by air pressure, the advancing and retreating unit 4 also advances or retreats via wedge members 19 to be described later. As a result, the brake shoe 2 attached to the advancing and retreating unit 4 is pressed against the tread surface S of the wheel.

Here, in the present embodiment, the advancing and retreating direction of the piston 18 of the piston unit 8 is orthogonal to the advancing and retreating direction of the advancing and retreating unit 4.

Figure 2B:
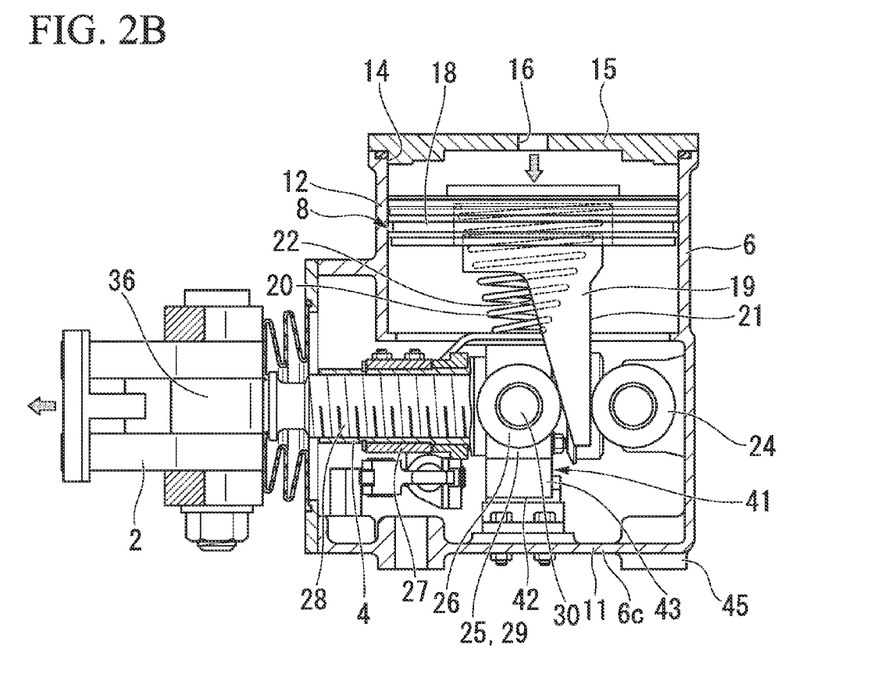
FIG. 2B is a cross-sectional view taken along the line A-A in FIG. 1, showing a state after insertion of the wedge member.

Furthermore, in the description below, the advancing and retreating direction of the advancing and retreating unit 4 and the brake shoe 2 is referred to as the braking direction, and the advancing and retreating direction of the piston 18 (and the wedge members 19 described later) is referred to as the drive direction. The side approached to induce braking of the wheel is referred to as the application side, and the side approached to release the brake is referred to as the release side. That is to say, in FIG. 1, the left side is the application side in the braking direction, and the right side is the release side in the braking direction. Similarly, in FIG. 2, the bottom is the application side in the drive direction, and the top is the release side in the drive direction.

Furthermore, the upward direction in FIG. 1, being the direction orthogonal to the drive direction and the braking direction, is referred to as above, and the direction opposite to the upward direction is referred to as below.

The casing 6 includes a cylindrical main body cylinder 11 having a central axis in the braking direction, and a piston cylinder section 12 integrally provided to one side of the main body cylinder 11. The main body cylinder 11 has a main body opening section 13 on the application side in the braking direction, and the piston cylinder section 12 has a piston opening section 14 on the release side in the drive direction.

The piston unit 8 is provided with; a piston cap 15, a piston 18, a pair of wedge members 19, and a compression coil spring 20. The piston cap 15 covers the piston opening section 14 of the piston cylinder section 12. In the piston cap 15 there is formed a supply opening 16 which introduces compressed air into the piston cylinder section 12. The piston 18 advances and retreats in the drive direction inside the piston cylinder section 12. The pair of wedge members 19 are integrally attached to the piston 18. The compression coil spring 20 urges the piston 18 towards the release side in the drive direction.

The wedge members 19 are flat members with a wedge shape when viewed from above. The equally shaped wedge members 19 are attached to the surface of the piston 18 on the application side in the drive direction, in a vertically symmetrical arrangement with respect to upper and lower parts of the piston 18. The wedge members 19 have a guide surface 21 along the drive direction, and an incline surface 22 formed at an incline relative to the drive direction such that the distance from the guide surface 21 gradually increases from the application side to the release side in the drive direction.

The compression coil spring 20 is such that one end is fixed to the side wall of a sleeve holding member 25 to be described later, and the other end is fixed to the application side surface of the piston 18 in the drive direction, between the pair of wedge members 19. That is to say, the piston 18 is urged towards the release side in the drive direction by the compression coil spring 20.

Furthermore, below the main body cylinder 11 of the casing 6, a filter 52 for collecting dust and the like is arranged, and a flow pipe 53 that connects to the filter 52 is arranged in a vertical direction. At the bottom end of this flow pipe 53, a downward facing flow opening 54 is formed, and the internal space of the casing 6 is connected to the atmosphere via this flow opening 54.

As shown in FIG. 2A and FIG. 2B, the fixed rollers 24 are fixed in such a position that, when the wedge members 19 move in the drive direction, the guide surface 21 remains in contact with the outer peripheral surface of the fixed rollers 24, so that the fixed rollers 24 rotate. The fixed rollers 24 are so-called roller followers which rotate when the outer peripheral surface thereof contacts a contact counterpart, and are rotatably attached to fixed roller shafts 24a which extend vertically and are attached to a top wall 6a and a bottom wall 6b of the casing 6.

The advancing and retreating unit 4 includes a sleeve holding member 25, moving rollers 26, a sleeve 27, and a push rod 28. The sleeve holding member 25 is movable in the braking direction. The moving rollers 26 are attached to the top and bottom of the sleeve holding member 25. The sleeve 27 is swingably secured to the sleeve holding member 25. The push rod 28 is attached to the end of the sleeve 27 on the application side in the braking direction.

The sleeve holding member 25 includes a main body 29 and a moving roller shaft 30 extending in the vertical direction of the main body 29, and is configured to be movable in the braking direction by a slide guide mechanism 41 to be described later.

Figure 3:
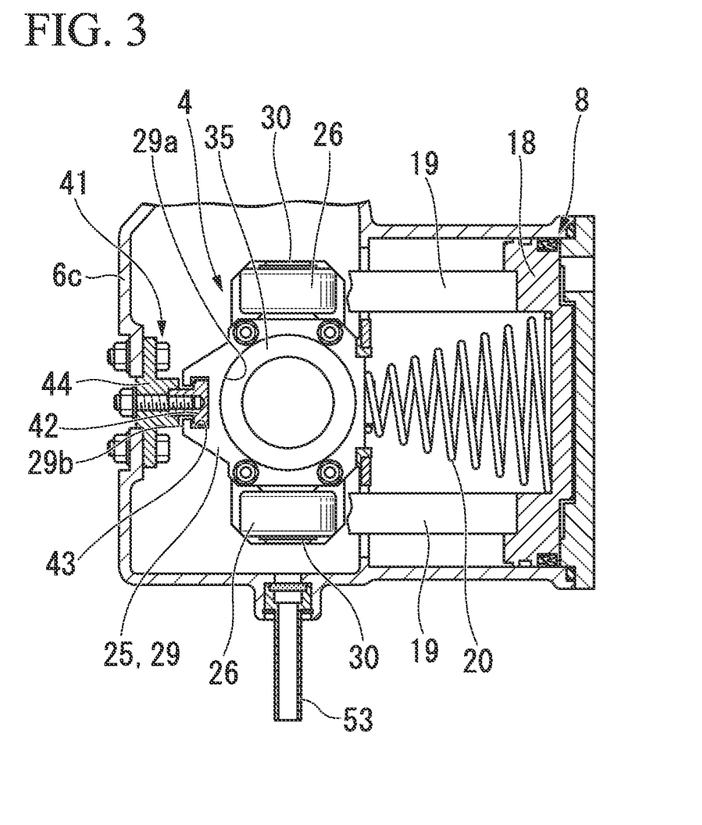
FIG. 3 is a cross-sectional view taken along the line B-B in FIG. 1.

The main body 29 of the sleeve holding member 25 is a substantially cuboid member, in which a mounting hole 29a for mounting a spherical plain bearing 35 is formed so as to pass through the two faces on either side in the braking direction. Furthermore, as shown in FIG. 3, in a side face 29b of the main body 29, there is formed a groove section 43.

The moving rollers 26 are each rotatably fixed to a moving roller shaft 30. The moving rollers 26 are roller followers similar to the fixed rollers 24, and are positioned so as to contact the incline surfaces 22 when the wedge members 19 move in the drive direction.

Furthermore, the spherical plain bearing 35 is mounted in the mounting hole 29a.

The sleeve 27 has a cylindrical shape, and the outer peripheral surface thereof is attached to the sleeve holding member 25 via the spherical plain bearing 35. As a result, the sleeve 27 is able to swing relative to the sleeve holding member 25, and is able to rotate about the central axis of the sleeve 27. Furthermore, there is formed a feed screw (female thread) on the inner peripheral surface of the sleeve 27.

The push rod 28 is an axial member which, as the sleeve 27 moves towards the application side in the braking direction, pushes the brake shoe 2 attached to the application side in the braking direction of the push rod 28 against the tread surface S. At the leading end of the push rod 28 on the application side in the braking direction, there is formed a bend section 36 which extends downward. On the release side of the push rod 28 in the braking direction, there is formed a feed screw (male thread) which engages with the feed screw of the sleeve 27. The leading end of the bend section 36 is connected to the incline adjustment opening 33 of the brake shoe 2 via a connecting pin 37.

Furthermore, on the sleeve holding member 25, there is attached a suitable gap adjustment mechanism (not shown) to maintain a constant brake gap when the brake is released. The gap adjustment mechanism is configured so as to move the push rod 28 to the application side in the braking direction by means of the feed screw described above, by rotating the sleeve 27 in accordance with the positions of the brake shoe 2 and the advancing and retreating unit 4.

Furthermore, in the main body opening section 13 of the casing 6, there is fitted a casing cap 17 that is formed with a hole in the center through which the push rod 28 can pass. Between the casing cap 17 and the sleeve holding member 25, a plurality of compression coil springs 38 are provided via a plurality of studs provided on both the casing cap 17 and the sleeve holding member 25. As a result, the sleeve holding member 25 is urged towards the release side in the braking direction.

Next, the slide guide mechanism 41 is described. The slide guide mechanism 41 is a mechanism which guides the sleeve holding member 25 that constitutes the advancing and retreating unit 4, in the braking direction.

The slide guide mechanism 41 includes a raised strip section 42 provided on the side wall 6c on the opposite side of the casing 6 to the wedge members 19, and a groove section 43 formed in the side face 29b of the main body 29 of the sleeve holding member 25.

Figure 4:
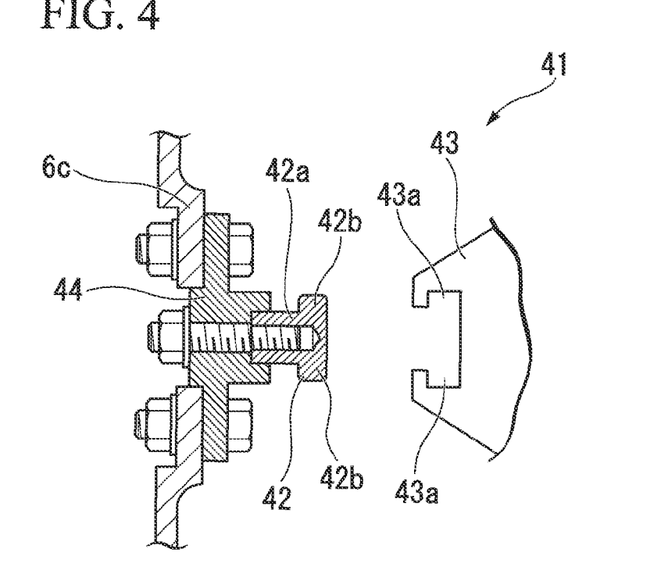
FIG. 4 is an enlarged disassembled view of a slide guide mechanism.

As shown in FIG. 4, the raised strip section 42 is a rail-like component which extends in the braking direction, and has a T-shaped cross-section when viewed from the braking direction, and is attached to the side wall 6c of the casing 6 via a bracket 44. Specifically, the bracket 44 is attached to the side wall 6c of the casing 6 by nuts and bolts, and the raised strip section 42 is attached to the bracket 44 by a bolt.

The raised strip section 42 includes a raised strip main body 42a which projects from the side wall 6c of the casing 6 and extends in the braking direction, and overhang sections 42b which project in a vertical direction from the leading end of the raised strip main body 42a.

The groove section 43 is an elongated groove part which extends in the braking direction and engages with the raised strip section 42, and is provided with a pair of overhang section grooves 43a for holding the overhang sections 42b of the raised strip section 42. That is to say, the cross-sectional shape of the groove section 43 when viewed from the braking direction is substantially the same as the raised strip section 42.

Figure 5:
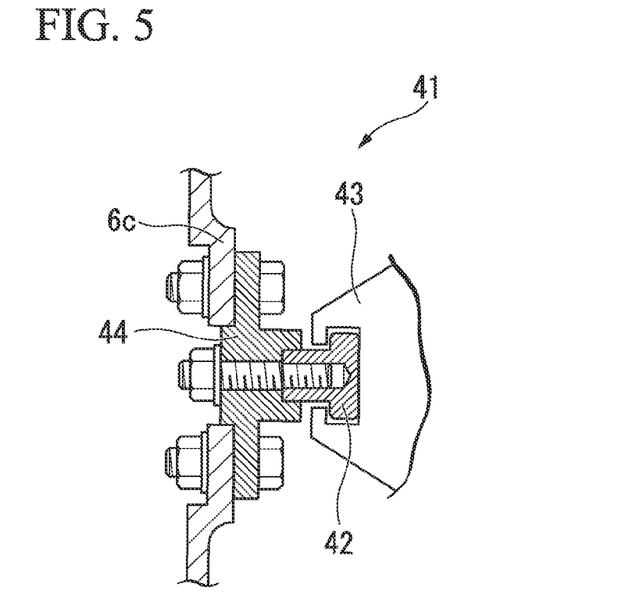
FIG. 5 is an enlarged view of the slide guide mechanism.

Furthermore, as shown in FIG. 5, a predetermined gap is provided between the raised strip section 42 and the groove section 43. As a result, the sleeve holding member 25 (advancing and retreating unit 4) is able to incline slightly with respect to the casing 6.

Here, the mechanism by which the incline of the brake shoe 2 is adjusted, is described. The incline adjustment opening 33 of the brake shoe 2 is formed with an elongated shape so as to allow the brake shoe 2 to tilt at a fixed angle. When an action such as releasing the brake causes the brake shoe 2 to tilt, the incline of the brake shoe 2 can be restricted by the connecting pin 37 contacting the inside wall of the incline adjustment opening 33.

Next, the operation of the brake device 1 is described.

Here, the brake shoe 2 is positioned at the farthest extent of the release side in the braking direction, that is, at the standby position, and the piston 18 is positioned at the farthest extent of the release side in the drive direction. The wedge members 19, as shown in FIG. 2A, are in a state where the leading ends thereof are inserted to a small extent between the fixed rollers 24 and the moving rollers 26. That is to say, the moving rollers 26 are in a state closest to the fixed rollers 24.

When a braking force is to be applied to the wheel by the brake shoe 2, compressed air is introduced from the supply opening 16 of the piston unit 8. This drives the piston 18 in the drive direction against the urging force of the compression coil spring 20. Therefore the wedge members 19 attached to the piston 18 move in the drive direction.

As shown in FIG. 2B, the wedge members 19 enter the space between the fixed rollers 24 and the moving rollers 26. Therefore the moving rollers 26 are subjected to a pressing force in a direction orthogonal to the incline surface 22 of the wedge member 19, in other words, a pressing force having a component of force towards the application side in the braking direction. This pushing of the moving rollers 26 causes the sleeve holding member 25 attached to the moving rollers 26 to move against the urging force of the compression coil springs 38.

At this time, the slide guide mechanism 41 restricts the movement direction of the sleeve holding member 25 to the braking direction. Movement of the sleeve holding member 25 towards the application side in the braking direction causes the brake shoe 2 to move via the sleeve 27 and the push rod 28, towards the application side in the braking direction, and press against the tread surface S of the wheel, thereby applying a braking force.

At this time, accompanying rotation of the hanger 5 about the connecting pin 31 serving as the pivot point, the brake shoe 2 moves towards the application side in the braking direction while swinging about the connecting pin 31. When this occurs, the leading end on the application side in the braking direction of the push rod 28 connected to the brake shoe 2 follows the same trajectory. That is to say, the advancing and retreating movement of the push rod 28 is accompanied by swinging of the leading end of the push rod 28. However the sleeve 27 engaged with the end side of the push rod 28 is rendered swingable by the spherical plain bearing 35, so that this swinging movement is absorbed.

Furthermore, as shown in FIG. 5, because a gap is provided between the raised strip section 42 and the groove section 43, even in a case in which the leading end of the push rod 28 connected to the sleeve holding member 25 via the sleeve 27 swings, this swinging movement can be absorbed.

To release the braking force applied to the wheel, compressed air is exhausted from the supply opening 16 of the piston unit 8. Whereupon, the compression coil spring 20 which had contracted due to the compressed air expands, and the piston 18 moves towards the release side in the drive direction, returning to its original position. As a result, the sleeve holding member 25 (advancing and retreating unit 4) is no longer subjected to force from the piston 18 and the wedge members 19 towards the application side in the braking direction. Consequently, the compression coil springs 38 provided inside the main body cylinder 11 of the casing 6 expand, and the brake shoe 2 moves towards the release side in the braking direction, returning to its original position. In this case, the slide guide mechanism 41 restricts the movement direction of the sleeve holding member 25 to the braking direction.

As described above, according to the present embodiment, the raised strip section 42 and the groove section 43 are provided integral with the sleeve holding member 25 constituting the advancing and retreating unit 4, and the side wall 6c of the casing 6. Consequently, the size of the slide guide mechanism 41 can be reduced, enabling the overall size of the brake device 1 to be reduced.

In the raised strip section 42 and the groove section 43 which constitute the slide guide mechanism 41, the overhang sections 42b and overhang section grooves 43a are respectively provided so as to engage with each other. Consequently, movement of the advancing and retreating unit 4 towards the release side in the drive direction can be more precisely controlled.

Next, another embodiment of a slide guide mechanism is described.

Figure 6:
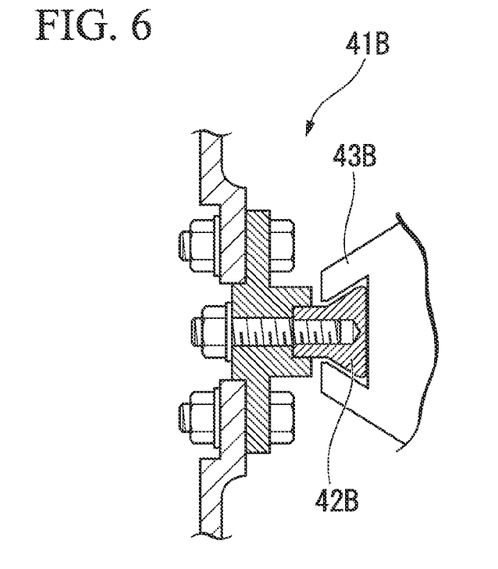
FIG. 6 shows a slide mechanism according to another embodiment of the present invention.

A slide guide mechanism 41B of a brake device according to another embodiment, as shown in FIG. 6, includes a raised strip section 42B with a dovetail shape and a groove section 43B with a dovetail groove shape. By employing these shapes, the slide guide mechanism can sometimes be realized in less space.

Figure 7:
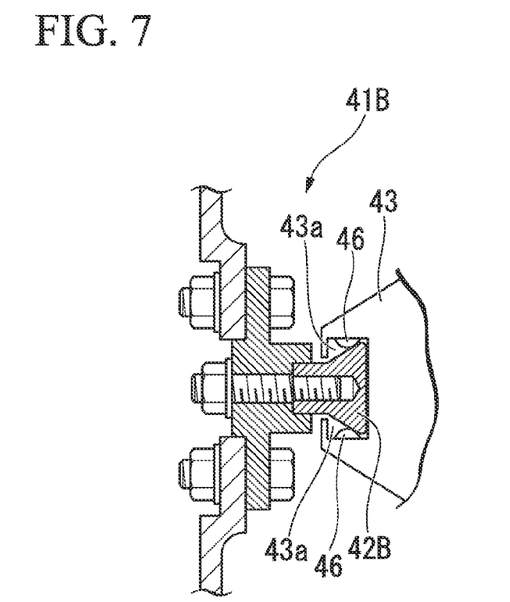
FIG. 7 shows a slide mechanism according to another embodiment of the present invention.

Furthermore, as shown in FIG. 7, balls or rollers 46 can be rotatably supported on the surface of the overhang section grooves 43a, such that the space formed by these balls or rollers 46 and the overhang section grooves 43a has substantially the same cross-section as the raised strip section 42B.

Figure 8:
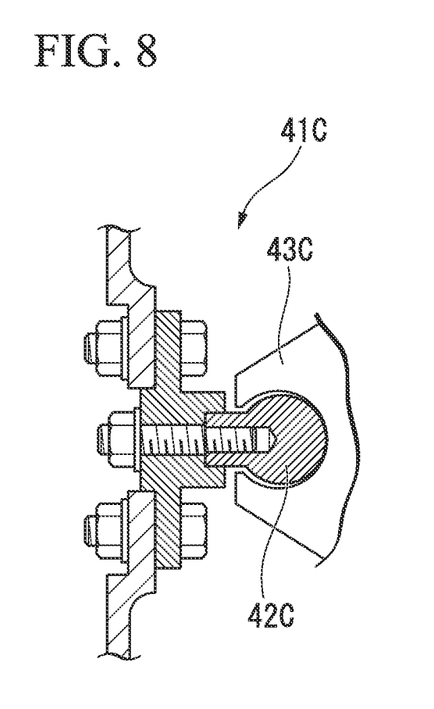
FIG. 8 shows a slide mechanism according to another embodiment of the present invention.

A slide guide mechanism 41C of a brake device according to yet another embodiment, as shown in FIG. 8, includes a raised strip section 42C with a substantially circular cross-section, and a groove section 43C with a corresponding substantially circular cross-section. By employing these shapes, the slide guide mechanism can be formed more easily.

The technical scope of the present invention is in no way limited by the examples presented above, and various modifications may be made without departing from the gist of the present invention.

For example, in the embodiments described above, the construction is such that the groove section 43 is formed in the sleeve holding member 25 and the raised strip section 42 is provided in the casing 6. However the construction may be such that the raised strip section is formed on the sleeve holding member 25 side, and the groove section is provided in the casing 6.

Furthermore, in the embodiments above, the raised strip section 42 is attached to the casing 6 via the bracket 44. However the invention is not limited to this configuration, and the raised strip section 42 may be mounted directly on the casing 6, or the raised strip section 42 may be formed directly on the casing 6.

The invention is not to be considered as being limited by the foregoing description, and is only limited by the scope of the appended claims.

What is claimed is:

1. A brake device comprising:
    a damper which applies a braking force to a braking target by advancing towards and contacting the braking target;
    an advancing and retreating member which causes the damper to advance and retreat in a braking direction towards the braking target;
    a support section which supports the advancing and retreating member in a manner enabling advancing and retreating in the braking direction; and
    wedge members provided so as to be capable of advancing and retreating in a drive direction orthogonal to the braking direction, which are advanced to an application side in a drive direction towards the advancing and retreating member, to thereby cause the advancing and retreating member to advance towards a braking side in the braking direction, wherein
    the support section is provided on an opposite side to the wedge members with respect to the advancing and retreating member, and is capable of supporting the advancing and retreating member on an application side in a drive direction,
    on one of the support section and the advancing and retreating member, there is provided a raised strip section which projects towards the other, and extends in the braking direction, and
    on the other of the support section and the advancing and retreating member there is provided a groove section which restricts movement of the raised strip section towards a release side in the drive direction, and restricts movement of the raised strip section to both sides in a widthwise direction orthogonal to the drive direction and the braking direction.

2. A brake device according to claim 1, wherein a leading end of the raised strip section has overhang sections which extend in the widthwise direction relative to a base end, and the groove section has a shape that is widened at a bottom to correspond to the raised strip section.

3. A brake device according to claim 2, wherein the raised strip section has a T-shaped cross-section, and the groove section has a T-shaped cross-section corresponding to that of the raised strip section.

4. A brake device according to claim 2, wherein the groove section has a dovetail groove shape in cross-section, and the raised strip section has a dovetail shape corresponding to that of the groove section.

* * * * *